(12) United States Patent
Tsotsis et al.

(10) Patent No.: US 7,435,693 B2
(45) Date of Patent: Oct. 14, 2008

(54) TOUGHENED, NON-CRIMPED UNIDIRECTIONAL FABRIC APPARATUS AND METHOD OF MAKING SAME

(75) Inventors: Thomas K Tsotsis, Orange, CA (US); Winfried Steinhauser, Coesfeld (DE)

(73) Assignee: The Boeing Company, Chicago, IL (US)

( * ) Notice: Subject to any disclaimer, the term of this patent is extended or adjusted under 35 U.S.C. 154(b) by 237 days.

(21) Appl. No.: 11/031,718

(22) Filed: Jan. 7, 2005

(65) Prior Publication Data

US 2006/0154545 A1    Jul. 13, 2006

(51) Int. Cl.
*B32B 5/26* (2006.01)
*D03D 15/08* (2006.01)

(52) U.S. Cl. .............. 442/268; 442/277; 442/185; 442/186; 442/217; 442/189

(58) Field of Classification Search .......... 442/268, 442/277, 185, 186, 217, 189
See application file for complete search history.

(56) References Cited

U.S. PATENT DOCUMENTS

| | | | |
|---|---|---|---|
| 5,192,601 A * | 3/1993 | Neisler | 428/120 |
| 5,538,781 A * | 7/1996 | Rao et al. | 442/217 |
| 5,891,516 A * | 4/1999 | Gstrein et al. | 427/189 |
| 6,265,333 B1 | 7/2001 | Dzenis et al. | |
| 6,503,856 B1 * | 1/2003 | Broadway et al. | 442/366 |
| 2005/0085147 A1 * | 4/2005 | Homma et al. | 442/218 |

FOREIGN PATENT DOCUMENTS

EP    1 125 728    8/2001

* cited by examiner

*Primary Examiner*—Norca Torres-Velazquez
(74) *Attorney, Agent, or Firm*—Harness, Dickey & Pierce, P.L.C.

(57) ABSTRACT

A non-crimped, unidirectional fabric. The fabric includes a plurality of non-crimped, unidirectional fibers arranged parallel to one another. Weft fibers are arranged perpendicular to the non-crimped, unidirectional fibers. Warp fibers are arranged parallel to the non-crimped, unidirectional fibers. The weft fibers are woven around the non-crimped, unidirectional fibers and around the warp fibers without crimping the unidirectional fibers. A non-woven thermoplastic fabric is secured, such as by melt bonding, to the non-crimped unidirectional fibers to act as a toughening layer and improve the impact resistance of the fabric after it is molded into a part. The resulting fabric has excellent end-to-end uniformity, excellent resistance to fluids often encountered in aerospace and commercial aircraft applications, is readily adapted for use with conventional liquid-molding operations, and is ideally suited to aerospace and aircraft manufacturing applications where lightweight yet structurally strong component parts are needed.

10 Claims, 3 Drawing Sheets

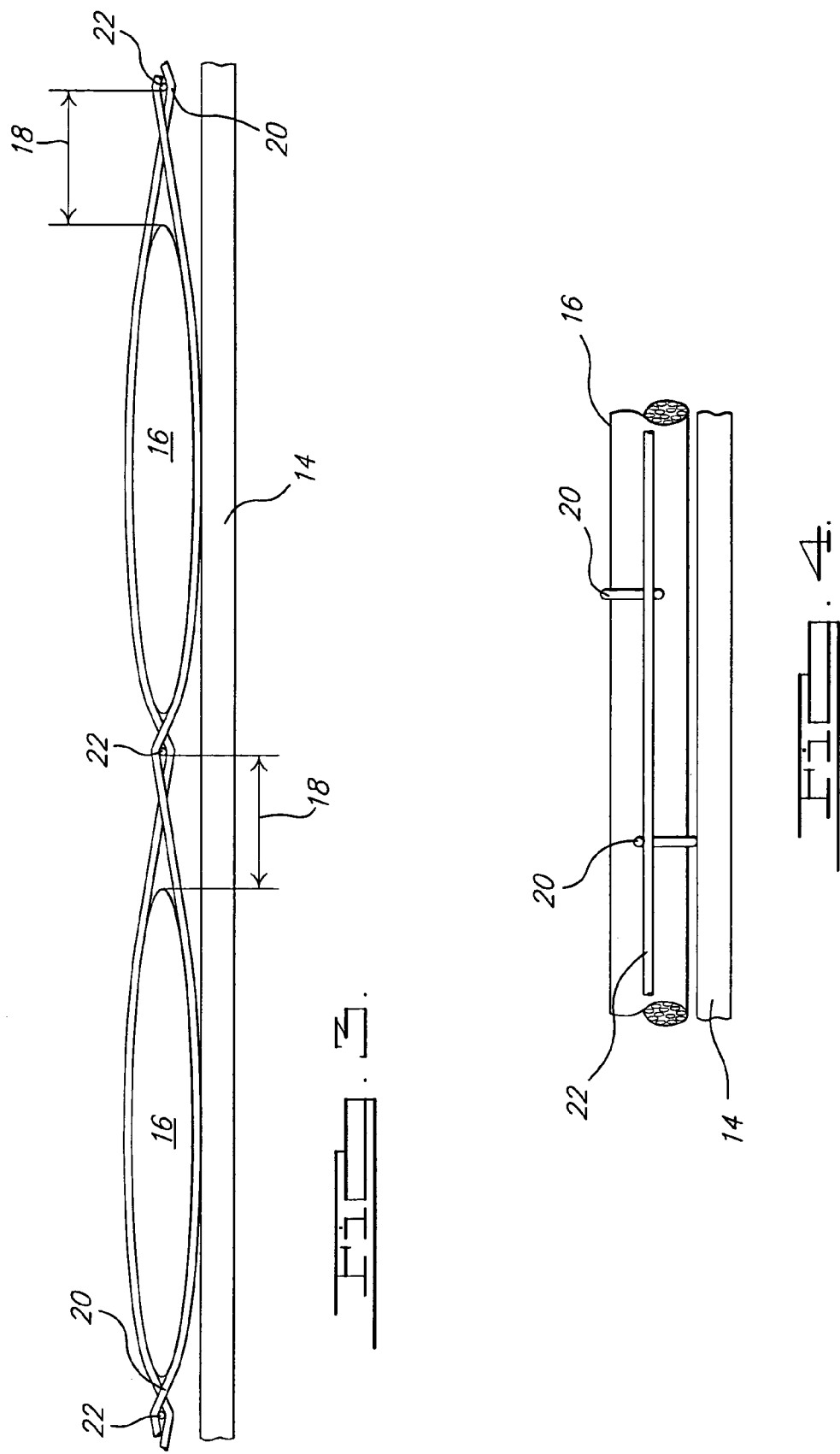

TOUGHENED, NON-CRIMPED UNIDIRECTIONAL FABRIC APPARATUS AND METHOD OF MAKING SAME

FIELD

The present disclosure relates to unidirectional fabric materials, and more particularly to a fabric employing non-crimped unidirectional tows with a non-woven toughening interlayer.

BACKGROUND

Non-crimped, unidirectional fabrics are needed for certain structural applications, especially in the manufacture of portions of spacecraft and commercial aircraft. However, existing unidirectional fabrics often have limited uniformity that is necessary for aerospace quality needs. Furthermore, present day fabrics often do not have the impact resistance needed for aerospace applications.

Accordingly, it would be highly desirable to provide a unidirectional fabric that is especially well suited for aerospace and commercial aircraft manufacturing applications. More particularly, it would be desirable to provide a unidirectional fabric that has excellent end-to-end uniformity in fabric construction as well as excellent impact resistance once it is manufactured into a composite structural component.

SUMMARY

The present disclosure relates to a unidirectional fabric that combines a woven, non-crimped unidirectional fabric with a non-woven, toughening layer to stabilize the unidirectional fabric. In one preferred embodiment the unidirectional fabric comprises a plurality of non-crimped, unidirectional fiber tows over which are woven a plurality of additional fibers in a weft direction to form a fabric layer. A non-woven, toughening layer is then secured to the fabric layer to produce a woven, non-crimped, unidirectional fabric having excellent end-to-end uniformity.

In one preferred form the toughening layer comprises a non-woven, thermoplastic fabric. In one preferred form the fabric has a thickness of about 20 microns-40 microns and includes carbon tows as the non-crimped, unidirectional tows.

A preferred embodiment of the present disclosure includes both weft and warp tows employed in a weave around the unidirectional fabric tows. The non-woven, thermoplastic fabric is secured, such as by melt bonding, to at least one surface of the unidirectional fabric tows. The non-woven, thermoplastic fabric imparts improved impact resistance to the fabric when the fabric is used to make a composite structure. The fabric provides a unidirectional material having excellent end-to-end uniformity. Furthermore, the fabric does not require a stabilizing binder.

The features, functions, and advantages can be achieved independently in various embodiments of the present disclosure or may be combined in yet other embodiments.

BRIEF DESCRIPTION OF THE DRAWINGS

The present disclosure will become more fully understood from the detailed description and the accompanying drawings, wherein:

FIG. 3 is a cross-sectional view of a portion of the fabric of FIG. 1 taken in accordance with section line 3-3; and FIG. 4 is an exploded perspective view of the individual components of the fabric of FIG. 1.

DETAILED DESCRIPTION

The following description of the various embodiment(s) is merely exemplary in nature and is in no way intended to limit the disclosure, its application, or uses.

Figure 1:
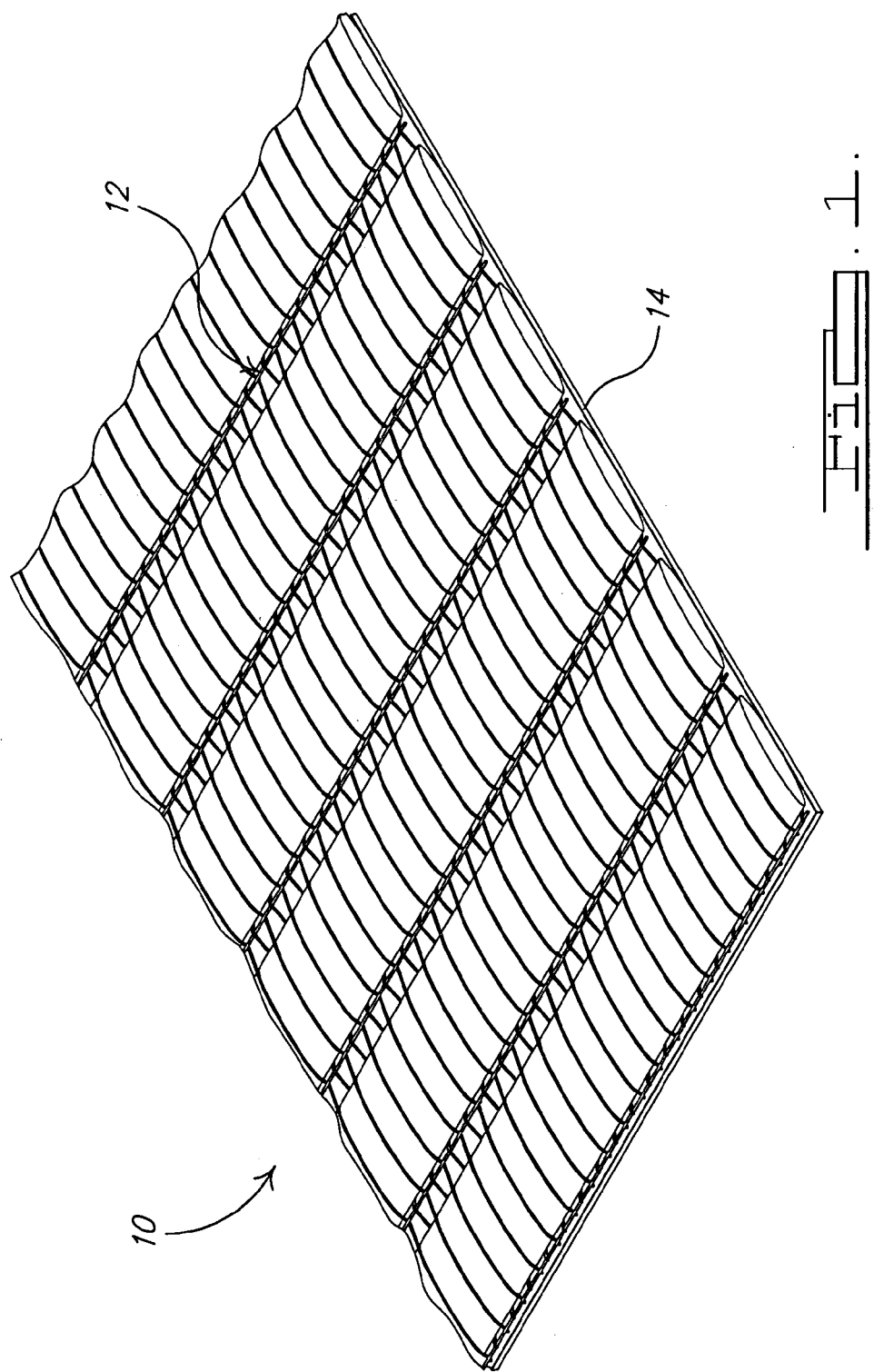
FIG. 1 is a perspective view of a fabric in accordance with a preferred embodiment of the present disclosure.
Figure 2:
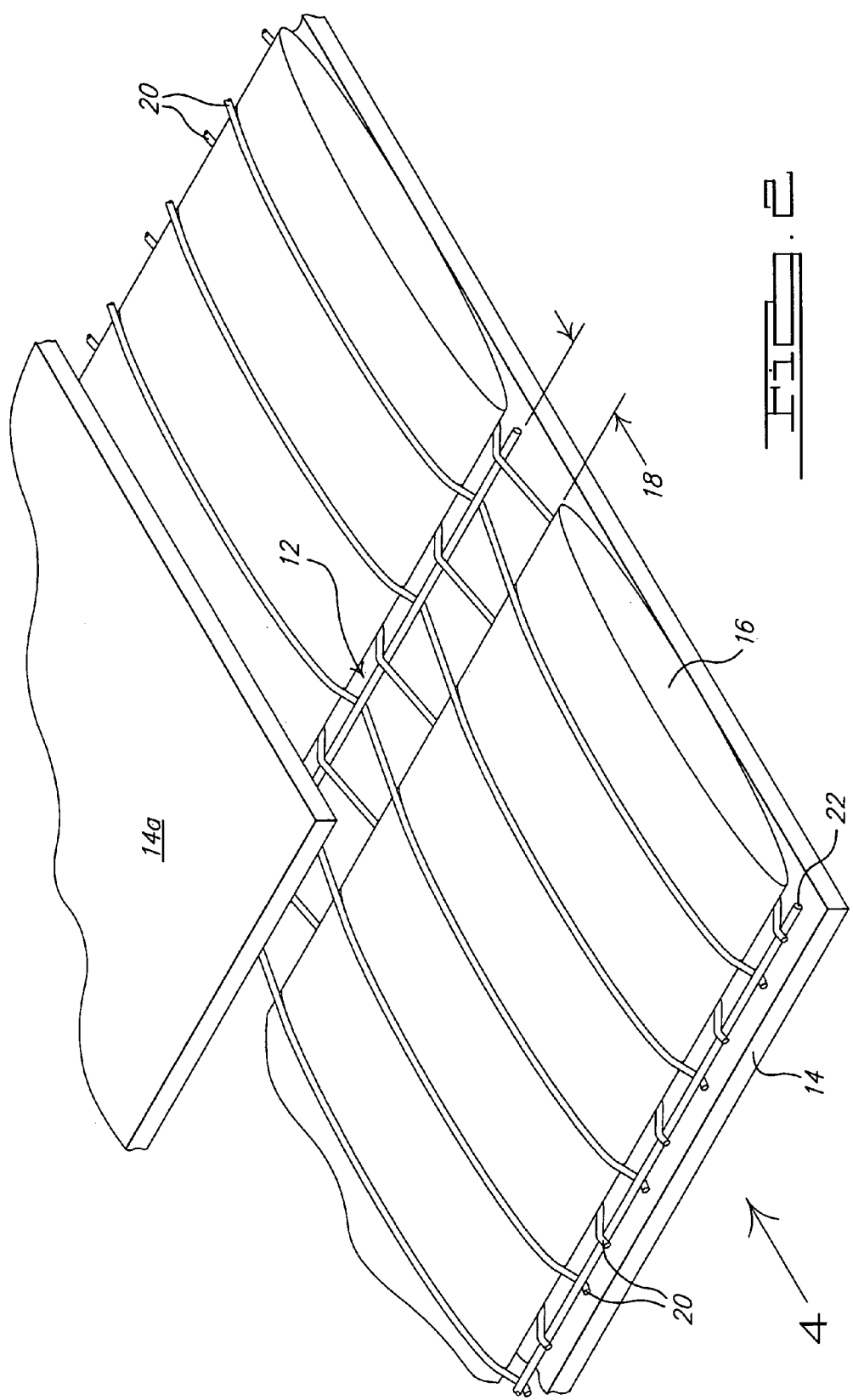
FIG. 2 is an enlarged cross-sectional view of a portion of the fabric of FIG. 1 taken in accordance with section line 2-2.

Referring to FIGS. 1 and 2, there is shown a unidirectional fabric 10 in accordance with an embodiment of the present disclosure. The unidirectional fabric 10 comprises a unidirectional fabric that is especially well suited for aerospace and commercial aircraft manufacturing applications. The unidirectional fabric 10 comprises a fabric layer 12 having at least one non-woven, toughening layer 14. FIG. 2 illustrates that an optional second non-woven, fabric layer 14a that can be placed over a surface of the fabric layer 12, opposite to thermoplastic layer 14, to sandwich the fabric layer 12 therebetween. In one preferred form the layer 14 is comprised of non-woven, thermoplastic fabric that is secured to the fabric layer 12 such as by melt-bonding.

Referring to FIGS. 2 and 4, the fabric layer 12 comprises a plurality of non-crimped, unidirectional structural tows 16 arranged generally parallel to one another. Each tow 16 is made up of preferably between about 1,000-100,000 filaments. In one preferred form the tows 16 comprise carbon, and preferably are of tow sizes of between about 12,000-24,000 filaments each. However, the size of tows 16 can be varied as needed to suit specific applications. The tows 16 may also be comprised of Kevlar® filaments, Zylon® filaments or Vectran® filaments.

The tows 16 are further spaced apart so that channels 18 are formed in between each pair of adjacent tows 16 along the length of the fabric layer 12. This better enables resin to be infused into and through the fabric layer 12 in a subsequent liquid-molding operation when the unidirectional fabric 10 is molded into a composite component. The channels 18 may vary in width but are preferably between about 0.010 inch-0.015 inch (0.254 mm-0.381 mm) wide. A plurality of weft tows 20 are laid along at least one surface of the unidirectional tows 16, and even more preferably along opposite surfaces of the tows 16 perpendicular to the tows 16. A plurality of warp or auxiliary tows 22 are preferably also laid perpendicular to the weft tows 20. The warp tows 22 are arranged parallel to the unidirectional tows 16 such that the weft tows 20 can be woven around them. The weft and warp tows 20, 22 may comprise polyester, fiberglass, or any other suitable material, and preferably make up between about 0.5% and 4.0% of the total weight of the unidirectional fabric 10, and even more preferably between about 0.5% and 2.0% of the overall weight of the unidirectional fabric 10. The warp and weft tows 22,20 may be generally of the same size, ranging from between 40 and 300 dtex, and preferably between 40 and 140 dtex, and even more preferably between 40 and 70 dtex. The weft tows 20 may be spaced apart by any desired spacing, for example, 0.25 inch or approximately 0.5 inch. Importantly, however, the weft and warp tows 20, 22 do not crimp the unidirectional tows 16 during a weaving process to form the fabric layer 12. FIGS. 3 and 4 illustrate the fabric 10 in accordance with section line 3-3 and line 4-4, respectively, in FIG. 2.

Referring to FIG. 4, the non-woven thermoplastic layers 14,14a may vary in thickness, but in one preferred form, each comprises a thickness of between about 20-40 microns. More importantly, the non-woven thermoplastic layers generally represent between 1% and 10% of the overall fabric dry weight, preferably between 2% and 8%, and even more preferably between 4% and 6%. The specific material used for the thermoplastic layers 14, 14a is also preferably melt-spinnable. However, it may be possible to form solution-spun fabrics that would still be melt-bondable for higher-viscosity thermoplastics. The thermoplastic layers 14,14a are further selected such that the material has good elevated temperature resistance (e.g, 350° F. or greater, or 177° C. or greater) which would be desirable for manufacturing primary aircraft structures. In one preferred form each of the non-woven thermoplastic layers 14, 14a comprises PAX030617 hot-melt adhesive web commercially available from Spunfab, Ltd., of Cuyahoga Falls, Ohio.

Thermoplastic layers 14,14a also provide the benefit of having excellent resistance to fluids such as water, hydraulic fluid, methyl ethyl ketone, and jet fuel. Of particular importance, however, is the improved impact resistance that the thermoplastic layers 14,14a provide to the unidirectional fabric 10. Impact improvement is greater than about 100% as measured by compression-after-impact strength with a greater than 90% reduction in impact-damage area. The overall weight of the unidirectional fabric 10 may vary but in one preferred form is between about 100-500 grams/meter$^2$, and more preferably between 150-190 grams/meter$^2$ if carbon is employed.

The unidirectional fabric 10 thus provides a non-crimped, unidirectional fabric that has improved toughness and impact damage resistance. By melt-bonding the thermoplastic toughening fabric, the need for applying a binder to the fabric layer 12 is eliminated. The unidirectional fabric 10 has excellent end-to-end uniformity, is readily adapted for use in conventional liquid-molding operations, and provides significantly improved impact resistance once molded into a part. The unidirectional fabric 10 also has improved handleability versus other unidirectional fabrics, and improved outlife (i.e., time at which the material may be handled without an unacceptable chemical advancement of a reaction) versus binderized fabrics because the thermoplastic fabric is non-reactive.

While various preferred embodiments have been described, those skilled in the art will recognize modifications or variations which might be made without departing from the inventive concept. The examples illustrate the disclosure and are not intended to limit it. Therefore, the description and claims should be interpreted liberally with only such limitation as is necessary in view of the pertinent prior art.

What is claimed is:

1. A unidirectional fabric comprising:
   a plurality of unidirectional, non-crimped structural tows;
   a plurality of weft tows woven around said plurality of structural tows generally perpendicular to said structural tows without crimping said structural tows, said weft tows having a thickness substantially less than that of said structural tows;
   a plurality of warp tows extending generally parallel to said structural tows, said weft tows being woven around said warp tows in between said structural tows, said structural tows, said warp tows and said weft tows forming a non-crimped, unidirectional fabric with said warp tows having a thickness substantially less than that of structural tows;
   said structural tows being separated by a distance of at least about 0.010 inch (0.254 mm) to enable infusion of a resin into said fabric; and
   a non-woven, toughening fabric having a plurality of fibers, with all of said fibers being completely melt-bonded to at least one surface of said non-crimped unidirectional fabric.

2. The unidirectional fabric of claim 1, wherein said structural tows comprise carbon tows.

3. The unidirectional fabric of claim 1, wherein said warp tows comprise at least one of glass tows and polyester tows.

4. The unidirectional fabric of claim 1, wherein said weft tows comprise at least one of glass tows and polyester tows.

5. The unidirectional fabric of claim 1, wherein said channels each have a width of between about 0.010-0.015 inch (0.254-0.381 mm).

6. The unidirectional fabric of claim 1, wherein said structural tows each comprise between about 1,000-100,000 filaments.

7. The unidirectional fabric of claim 1, wherein said non-woven, toughening fabric comprises a thickness of about 20 microns-40 microns.

8. The unidirectional fabric of claim 1, wherein said non-woven, toughening fabric comprises a non-woven, thermoplastic fabric.

9. A unidirectional fabric comprising:
   a plurality of unidirectional, non-crimped structural tows;
   a plurality of weft tows woven around said plurality of structural tows generally perpendicular to said structural tows without crimping said structural tows, said weft tows having a thickness substantially less than that of said structural tows and being spaced apart from one another by a distance of at least about 0.25 inch;
   a plurality of warp tows each having a thickness in a range of about extending generally parallel to said structural tows, said weft tows being woven around said warp tows in between said structural tows, said structural tows, said warp tows and said weft tows forming a non-crimped, unidirectional fabric with said warp tows having a thickness substantially less than that of structural tows;
   said warp and weft tows comprising between about 0.5-4.0 percent of a total weight of said fabric, and each of said warp and weft tows having a mass of between about 40-70 dtex;
   said structural tows being separated by a distance of at least about 0.010 inch (0.254 mm); and
   a non-woven, toughening fabric having a plurality of fibers, with all of said fibers being completely melt-bonded to at least one surface of said non-crimped unidirectional fabric.

10. The unidirectional fabric of claim 9, wherein the melt bonding of all of said fibers of said non-woven layer is adapted to assist in holding said structural tows, said warp tows and said weft tows against movement relative to one another during subsequent handling of said unidirectional fabric.

* * * * *